US012564847B1

(12) United States Patent
Su et al.

(10) Patent No.: US 12,564,847 B1
(45) Date of Patent: Mar. 3, 2026

(54) OVERHEAD SHOWER

(71) Applicant: Kaifeng Su, Dongguan (CN)

(72) Inventors: Kaifeng Su, Dongguan (CN); Shengyun Gan, Dongguan (CN); Cheng Luo, Dongguan (CN); Jiawei Du, Dongguan (CN); Haibo Xie, Dongguan (CN); Bo Li, Dongguan (CN); Hai Lin, Dongguan (CN)

(73) Assignee: Kaifeng Su, Dongguan (CN)

( * ) Notice: Subject to any disclaimer, the term of this patent is extended or adjusted under 35 U.S.C. 154(b) by 0 days.

(21) Appl. No.: 19/285,151

(22) Filed: Jul. 30, 2025

(30) Foreign Application Priority Data

Dec. 27, 2024 (CN) ........................ 202411953887.6

(51) Int. Cl.
*B05B 1/18* (2006.01)
*B05B 15/40* (2018.01)

(52) U.S. Cl.
CPC .............. *B05B 1/189* (2025.08); *B05B 15/40* (2018.02)

(58) Field of Classification Search
CPC ....... B05B 1/18; B05B 1/1821; B05B 1/1823; B05B 1/1825; B05B 1/188; B05B 1/189; B05B 1/1894; B05B 1/1896; B05B 1/30; B05B 1/3026; B05B 15/40
See application file for complete search history.

(56) References Cited

U.S. PATENT DOCUMENTS

| | | | | |
|---|---|---|---|---|
| 3,958,756 | A * | 5/1976 | Trenary | B05B 1/1636 239/444 |
| 4,190,207 | A * | 2/1980 | Fienhold | B05B 1/18 239/447 |
| 2004/0056123 | A1* | 3/2004 | Douglas | B05B 1/1654 239/587.4 |
| 2016/0236118 | A1* | 8/2016 | Sharratt | B05B 15/40 |
| 2017/0326561 | A1* | 11/2017 | Sharratt | B05B 15/40 |
| 2018/0161711 | A1* | 6/2018 | Chernov | B01D 35/04 |
| 2019/0336987 | A1* | 11/2019 | Wang | B05B 1/185 |
| 2025/0018408 | A1* | 1/2025 | Seidenfeld | B05B 1/18 |
| 2025/0269395 | A1* | 8/2025 | Soetaert | B05B 15/40 |
| 2025/0312715 | A1* | 10/2025 | Chang | B01D 35/306 |

FOREIGN PATENT DOCUMENTS

| | | | | |
|---|---|---|---|---|
| CN | 119281526 | A * | 1/2025 | B05B 1/18 |

* cited by examiner

*Primary Examiner* — Darren W Gorman
(74) *Attorney, Agent, or Firm* — Cooper Legal Group, LLC

(57) ABSTRACT

An overhead shower includes a housing, a filtering device and a gear adjustment device, whereby the housing includes a top cover and a base cover detachably connected with each other, an end of the top cover is configured with a water inlet, an end of the base cover is configured with a first water outlet hole, the filtering device is arranged inside the top cover for intercepting impurities and particulate matters in water, the gear adjustment device is located inside the base cover for controlling water flow volume and spray pattern, a water passage is formed in the housing for connecting the filtering device and the gear adjustment device, and a first end of the water passage communicates with the water inlet while a second end of the water passage communicates with the first water outlet hole.

12 Claims, 10 Drawing Sheets

OVERHEAD SHOWER

CROSS-REFERENCE TO RELATED APPLICATION

The present application is based on and claims the priority benefits of China application No. 202411953887.6, filed on Dec. 27, 2024. The entirety of China application No. 202411953887.6 is hereby incorporated by reference herein and made a part of this specification.

TECHNICAL FIELD

The present application relates to the field of shower equipment, and more particularly, to an overhead shower.

BACKGROUND ART

With the improvement of living standards, people's requirements for shower equipment have become increasingly higher. As a standard fixture in bathroom installations, the water flow performance and user-friendliness of an overhead shower directly affect users' showering experience.

The existing technology discloses an overhead shower including a shower head body and a water distribution plate assembly, where the shower head body includes a cover plate and a face plate arranged sequentially from top to bottom, forming a cavity therebetween. The cover plate is provided with a water inlet hole, and the face plate is provided with multiple water outlet holes. The water distribution plate assembly is arranged within the cavity and includes a retaining wall on the face plate and a water distribution body snap-fastened to the retaining wall. The retaining wall is internally provided with a first water distribution channel and a second water distribution channel. The water distribution body is further provided with a water distribution chamber, which includes a water inflow channel, a first water outlet channel communicating with the first water distribution channel, and a second water outlet channel communicating with the second water distribution channel. The water distribution chamber is additionally provided with a switching member capable of blocking either the first water outlet channel or the second water outlet channel.

The overhead shower in related technologies cannot effectively capture impurities and particulate matter in water, resulting in impure water quality that may compromise users' skin health. Additionally, the absence of an efficient flow adjustment mechanism prevents flexible control over water flow volume and spray patterns, making it difficult to meet diverse user demands.

SUMMARY

In order to overcome the shortcomings in related technologies and improve the user's showering experience, the present application provides an overhead shower.

The overhead shower provided by the present application includes a housing, a filtering device and a gear adjustment device, whereby the housing includes a top cover and a base cover detachably connected with each other, an end of the top cover is configured with a water inlet, an end of the base cover is configured with a first water outlet hole, the filtering device is arranged inside the top cover for intercepting impurities and particulate matters in water, the gear adjustment device is located inside the base cover for controlling water flow volume and spray pattern, a water passage is formed in the housing for connecting the filtering device and the gear adjustment device, and a first end of the water passage communicates with the water inlet while a second end of the water passage communicates with the first water outlet hole.

Purification of shower water quality and flexible adjustment of water flow volume and spray pattern are achieved through the meticulously designed housing (including the detachable connected top cover and bottom cover) of the present overhead shower. Water enters through the water inlet at the end of the top cover, passes through the filtering device that intercepts impurities, flows into the gear adjustment device in the base cover through the water passage, allows users to modulate the water flow volume and spray pattern via the gear adjustment mechanism, and purified, personalized water stream is discharged from the first water outlet holes at the end of the base cover, thereby ensuring water purity while enhancing personalization with bespoke comfort.

Optionally, the gear adjustment device includes a drainage base located in the base cover, a mounting seat located on the drainage base, a gear adjustment mechanism and a return mechanism both located on the mounting seat, the gear adjustment mechanism is configured to modulate a water dispersion pattern, and a first end of the return mechanism is connected to the gear adjustment mechanism while a second end of the return mechanism is connected with the base cover.

The drainage base, the mounting seat, the gear adjustment mechanism and the return mechanism of the gear adjustment device cooperate to realize the precise control of the water flow. After being filtered, the water flows into the drainage base, and then the flow pattern, such as the water flow intensity, spraying range, etc., is modulated according to user's requirements through the gear adjustment mechanism. The return mechanism ensures that the gear adjustment mechanism automatically returns to a preset state when not subjected to external force, facilitating subsequent use. Such design not only enhances shower comfort and personalization but also guarantees adjustment accuracy and stability through structural optimization, delivering users a superior showering experience.

Optionally, the gear adjustment mechanism includes an active rotary seat rotatably disposed in the base cover, an intermediate rotary seat inserted into the mounting seat and rotatably connected to the mounting seat, an annular rotary seat rotatably connected to the mounting seat, and a gear adjustment seat, the intermediate rotary seat interlocks with the annular rotary seat to rotate synchronously with the annular rotary seat, the active rotary seat is rotatably connected to the intermediate rotary seat to drive the intermediate rotary seat to intermittently rotate during rotation of the active rotary seat, the intermediate rotary seat interlocks with the gear adjustment seat to drive the gear adjustment seat to rotate in a preset angle per rotational increment.

By using the above-mentioned technical solution, the active rotary seat is flexibly rotated in the base cover, and the intermediate rotary seat is driven to intermittently rotate by a unique transmission mode thereof. Additionally, the interlock between the intermediate rotary seat and the annular rotary seat ensures the synchronous rotation of the both to enhance the stability and durability of the structure. During the rotation of the intermediate rotary seat, the gear adjustment seat is driven to rotate in a preset angle per rotational increment through the interlock, to realize a precise modulation of the flow pattern. Such design not only enhances the personalized showering experience but also ensures modulation accuracy and smoothness through structural optimization, delivering users more refined and diversified shower sensations.

Optionally, the gear adjustment seat is formed with three water inlet holes equidistantly distributed along a circumferential direction, the drainage base is formed with four circumferentially equidistant drainage holes: a first drainage hole, a second drainage hole, a third drainage hole and a fourth drainage hole, a radial line connecting a center point of the first drainage hole and a central reference point of the drainage base is defined as a first line segment, a radial line connecting a center point of the second drainage hole and the central reference point of the drainage base is defined as a second line segment, a radial line connecting a center point of the third drainage hole and the central reference point of the drainage base is defined as a third line segment, a radial line connecting a center point of the fourth drainage hole and the central reference point of the drainage base is defined as a fourth line segment, an included angle between the first line segment and the second line segment is 20°, an included angle between the second line segment and the third line segment is 20°, an included angle between the third line segment and the fourth line segment is 20°, so as to achieve three different water outlet modes during rotation of a gear adjustment disk.

By using the above-mentioned technical solution, through the innovative design of the gear adjustment seat and the drainage base, a precise switching of the water outlet gear and the diversified flow pattern are realized. The three evenly distributed water inlet holes on the gear adjustment seat cooperate with the four water outlet holes at a specific included angle (the included angle of each two adjacent drainage holes is 20°) on the drainage base, so that during rotation of the gear adjustment seat along with the intermediate rotary seat, three different water outlet gears may be precisely achieved, and each gear corresponds to a different combination of drainage holes to bring different water flow intensities, spray ranges and patterns. Such design not only significantly enhances the personalization and comfort of the showering experience but also ensures the stability of flow patterns and the accuracy of mode switching through structural refinements, providing users with a more diversified and refined showering experience.

Optionally, a plurality of positioning convex rings are circumferentially formed on an upper surface of the drainage base for positioning the three water inlet holes, a buffer mechanism is provided between the gear adjustment seat and the drainage base, the buffer mechanism includes a flexible buffer pad, the flexible buffer pad is circumferentially formed with a plurality of second guide holes, each of the plurality of second guide holes corresponds to one of the plurality of positioning convex rings, the plurality of positioning convex rings are inserted into the plurality of second guide holes respectively, and the flexible buffer pad envelops an outer peripheral surface of each of the plurality of positioning convex rings.

By additionally providing the buffer mechanism between the positioning convex ring on the drainage base and the gear adjustment seat, the stability and durability of the water outlet gear switching are further improved. The positioning convex ring accurately positions the water inlet hole on the gear adjustment seat to ensure that different combination of drainage holes can be realized per rotational increment, thereby realizing the stable switching of the flow mode. The flexible buffer pad in the buffer mechanism can not only reduce the friction and wear of the gear adjustment seat during its rotation, thereby prolonging its service life, but also provide a certain degree of buffering effect through its resilient characteristics, so that the switching of the flow mode is smoother and more successful. Such design not only enhances the comfort of the showering experience, but also improves the reliability and durability of the entire overhead shower through structural optimization.

Optionally, the buffer mechanism further includes a first mounting boss fixed on an upper surface of a drainage pan of the drainage base and a second mounting boss fixed on the gear adjustment seat, a top end of the first mounting boss is configured with a rotational groove, a bottom of the rotational groove is circumferentially provided with a plurality of protrusions, a triangular slot is formed between each pair of adjacent protrusions of the plurality of protrusions, the second mounting boss is rotatably connected to the second rotational groove, and a shape of an end of the second mounting boss matches a structure of the top end of the first mounting boss.

The second rotational groove at the top end of the first mounting boss including its protrusions and slots within it matches with the shape of the end of the second mounting boss, ensuring the accurate alignment and stable operation of the gear adjustment disk during rotation, and reducing noise and wear caused by rough rotation. The tight cooperation of the first mounting boss and the second mounting boss effectively disperses the friction force generated when rotating, reduces the direct contact area between the both, thus reducing the wear that may occur during long-term use, and extending the service life of the product. By optimizing the design of the rotating mechanism, the user has a better feel and smoother operation when modulating the gear, improving the overall use experience.

Optionally, the return mechanism includes a driving seat and a resilient member, one end of the driving seat is fixedly connected to the active rotary seat, a side wall of the base cover is formed with a sliding hole for passage of the driving seat, the sliding hole extends horizontally, the driving seat passes through the sliding hole to form a sliding fit with the sliding hole during rotation of the driving seat, a first end of the resilient member is connected to the driving seat while a second end of the resilient member is connected to the drainage base, and when an external force on the driving seat is removed, the driving seat is rotated to an initial position by an elastic force of the resilient member.

Through the ingenious design of the return mechanism in the aforementioned technical solution, the self-returning function for gear adjustment is achieved. The return mechanism includes a driving seat and a resilient member, where the driving seat is fixedly connected to the active rotary seat, and can horizontally slide along the sliding hole of the side wall of the base cover and rotate. Under the action of an external force, the driving seat drives the active rotary seat and the whole gear adjustment mechanism to rotate to the required water outlet gear. When the external force disappears, the resilient member drives the driving seat and the active rotary seat to automatically rotate to the initial position with the resilient force thereof to realize the automatic resetting of the gear. Such design not only simplifies user operation, thereby enhancing the convenience of the showering experience, but also ensures the accuracy and stability of gear adjustment through structural optimization, providing users with a more effortless and comfortable shower enjoyment.

Optionally, the overhead shower further includes a clamping device, whereby the clamping device includes at least one clamping mechanism and at least one release mechanism, the at least one clamping mechanism is located on the base cover for holding the top cover, and the at least one release mechanism is located on the base cover for unlocking the clamping mechanism.

Quick assembly and disassembly of the top cover and base cover can be achieved by the clamping device. The clamping mechanism uses the resilient force provided by the resilient member to press the clamping half-ring cling tightly against the top cover to ensure a stable connection between the top cover and the base cover. The release mechanism drives the first rotating member to rotate via the button, and in turn moves a linkage block to release the locking state of the clamping half-ring, so that a user may easily separate the top cover and the base cover when needed, to clean and maintain the internal components conveniently.

Optionally, the clamping mechanism includes a clamping half-ring and a resilient member, the clamping half-ring is arranged between a bearing ring and the gear adjustment device, a first end of the resilient member abuts against an outer side wall of the clamping half-ring while a second end of the resilient member abuts against an inner side wall of the base cover, and the clamping half-ring is configured to generate a resilient force towards the top cover under a resilient force of the resilient member.

Through the above-mentioned clamping mechanism, the top cover and the base cover may be effectively fixed, to ensure the structural stability and sealing performance of the overhead shower. The clamping half-ring is closely attached to the top cover under the resilient force of the resilient member to prevent water leakage, additionally, it is also convenient for a user to quickly assemble and disassemble the top cover for cleaning and maintenance.

Optionally, the release mechanism includes a rotating member and a button, the rotating member is rotatably connected with the base cover, a first end of the rotating member is located at an inner side wall at an end of the clamping half-ring, and the button is in a sliding fit with the base cover for driving a second end of the rotating member to rotate.

The release mechanism is provided so that a user can unlock the clamping mechanism by simply pressing the button, thereby conveniently separating the top cover and the base cover, and facilitating cleaning and replacement of the filtering device. The rotating member is rotatably connected to the base cover, and the first end thereof is located at the inner side wall at the end of the clamping half-ring, so that when pressing the button, the button drives the rotating member to rotate, and in turn releases the clamping half-ring, thereby releasing the connection between the top cover and the base cover. Such design not only improves the user experience, but also simplifies the maintenance process and enhances the practicality and convenience of the product.

In summary, the present application includes at least one of the following beneficial technical effects:

1. The filtering device is provided inside the top cover, and can effectively intercept impurities and particulate matters in water, thereby ensuring the water purity and hygienic safety, thereby safeguarding the user' skin healthy.

2. Three different water outlet gears may be precisely achieved through the cooperative action of the active rotary seat, the intermediate rotary seat, the annular rotary seat, and the gear adjustment seat, thereby achieving various spray patters such as mist, rainfall, and jet to meet different user needs.

3. The return mechanism, through the action of the driving seat and the resilient member, can automatically return to the initial position after the external force disappears, thereby ensuring the stability and reliability of the gear adjustment process.

DETAILED DESCRIPTION

The present application is described in further detail in conjunction with FIGS. 1-10.

The terminology used in the present application is for the purpose of describing particular embodiments only and is not intended to limit the present application. Unless otherwise defined, technical or scientific terms used herein shall have the ordinary meanings understood by a person skilled in the art to which the present application belongs. The terms “first”, “second” and similar terminology used in the present application do not denote any order, quantity, or importance, but are used solely to distinguish different components.

Figure 1:
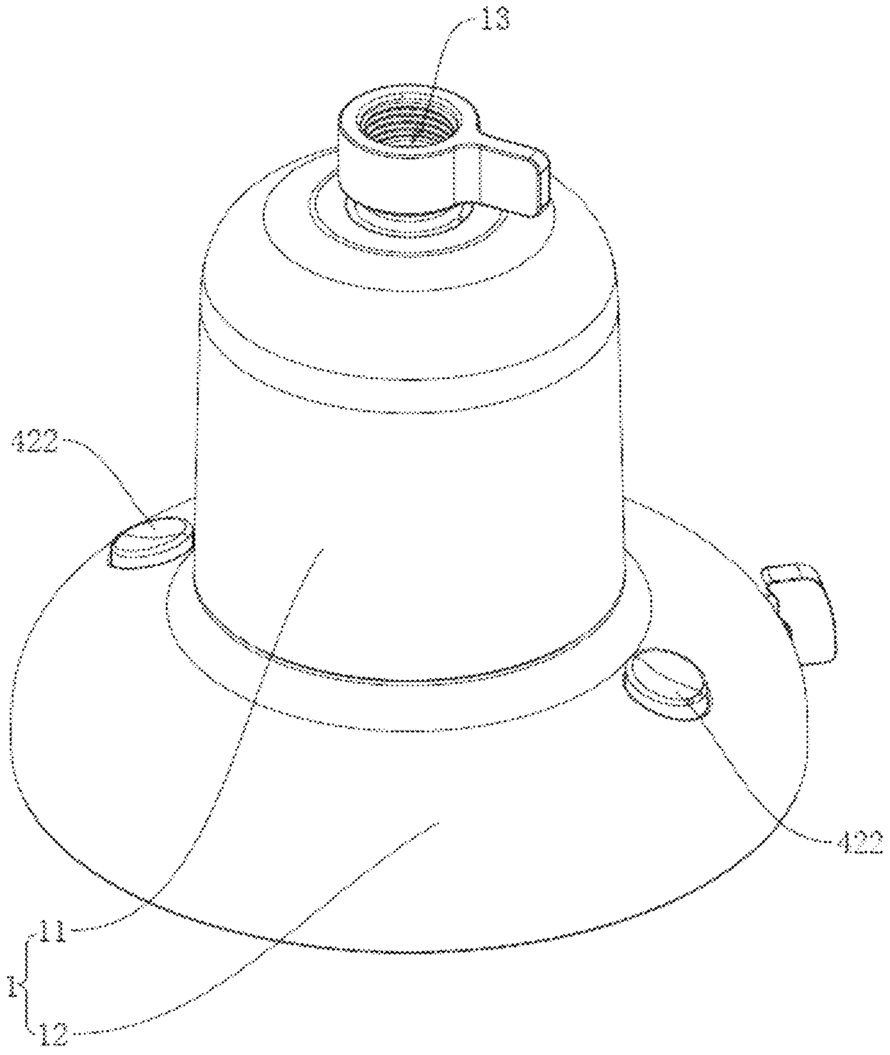
FIG. 1 is a schematic diagram showing the structure of an overhead shower according to the present application.

When describing specific details of the overhead shower in the present embodiment, for enhanced understanding and clarity, we will use the placement state of the overhead shower shown in FIG. 1 as the reference for explanation.

Figure 2:
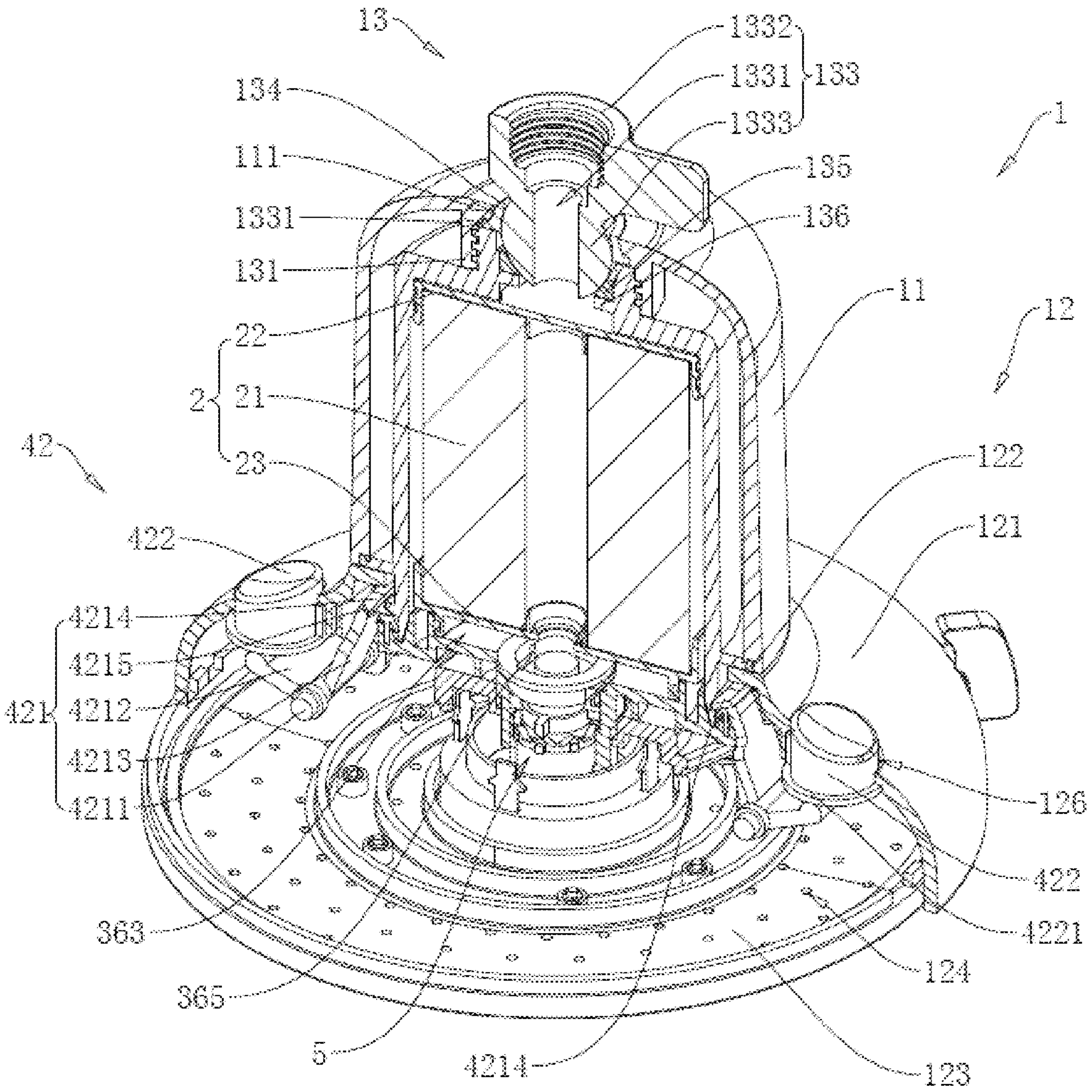
FIG. 2 is a partial cross-sectional view showing an overhead shower according to the present application.

The present application discloses an overhead shower. Referring to FIGS. 1 and 2, the overhead shower includes a housing 1 including a top cover 11 and a base cover 12. A water inlet 111 is provided at the top of the top cover 11 for introducing water flow, and a plurality of first water outlet holes 124 are provided at the bottom of the base cover 12 for uniformly distributing water discharge. The top cover 11 is detachably connected with the base cover 12 for ease of internal cleaning and maintenance.

Figure 3:
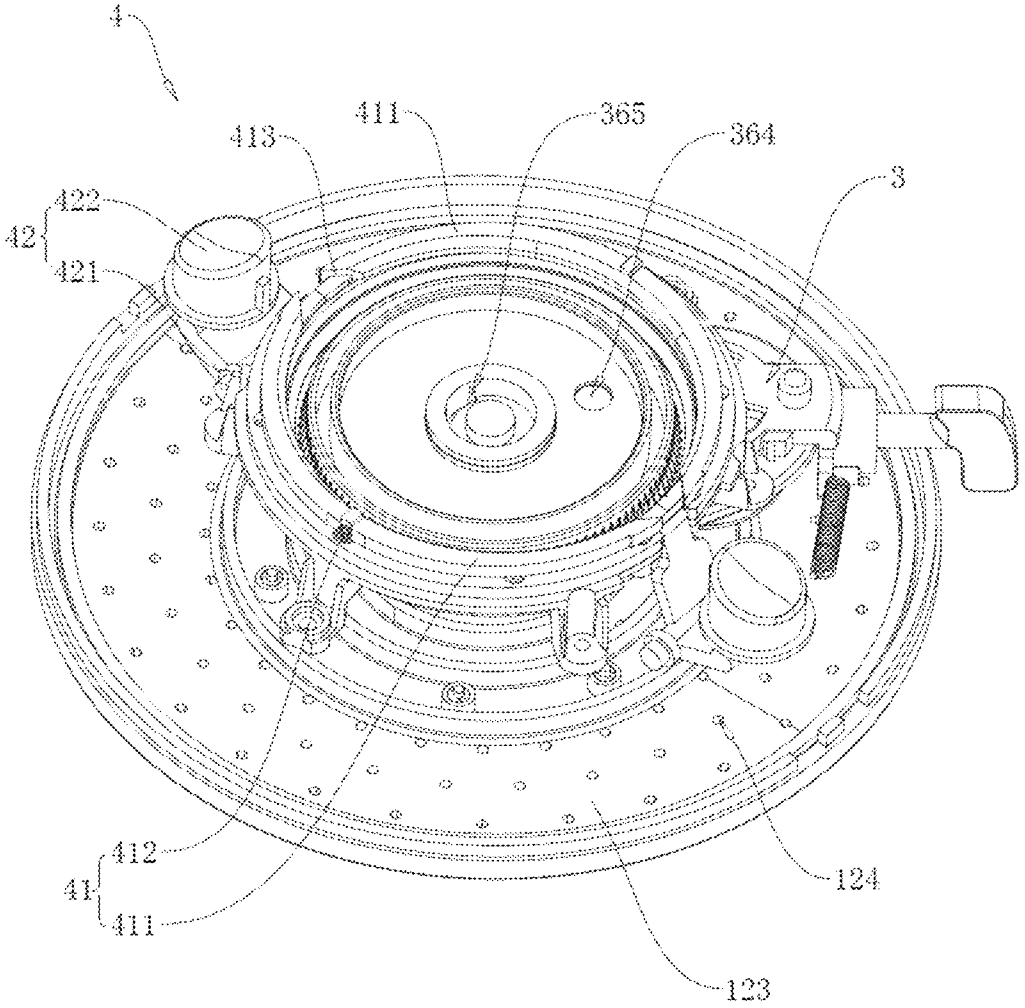
FIG. 3 is a schematic diagram showing the structure of a clamping mechanism and a release mechanism according to the present application.

Referring to FIGS. 2 and 3, a filtering device 2 and a gear adjustment device 3 are provided inside the housing 1. The filtering device 2 is installed inside the top cover 11 mainly for catching impurities and particulate matters in water, to ensure the water purity and hygienic safety, thereby safeguarding the users' skin healthy. The gear adjustment device 3, which is located inside the base cover 12, is a key component for controlling the water flow volume and the spray pattern. Users may adjust the gear adjustment device 3 according to personal preference and requirements to modify the water flow rate and spray pattern, thereby achieving a more personalized shower experience.

Referring to FIG. 2, a water passage is disposed inside the housing 1, which serves as a critical conduit for connecting the filtering device 2 and the gear adjustment device 3, where one end precisely interfaces with the water inlet 111 to ensure seamless inflow, while the other end precisely communicates with the first water outlet holes 124, so that the filtered and adjusted water flow can be sprayed smoothly and efficiently, thus delivering an optimal shower experience.

Referring further to FIG. 2, the top cover 11 is internally provided with a water inflow mechanism 13 at an end proximal to the water inlet 111, and the water inflow mechanism 13 includes a mounting ring 131 and a positioning member 132, where an end of the mounting ring 131 near the water inlet 111 is integrally formed with an inner side wall of the top cover 11 to form a water inflow channel 1331 communicating with the water inlet 111. Two ends of the mounting ring 131 are both open, and the top end of the mounting ring 131 is in communication with the water inlet 111. The positioning member 132 is in threaded connection with the mounting ring 131, thereby enhancing the operational ease during installation and removal of the positioning member 132.

Figure 4:
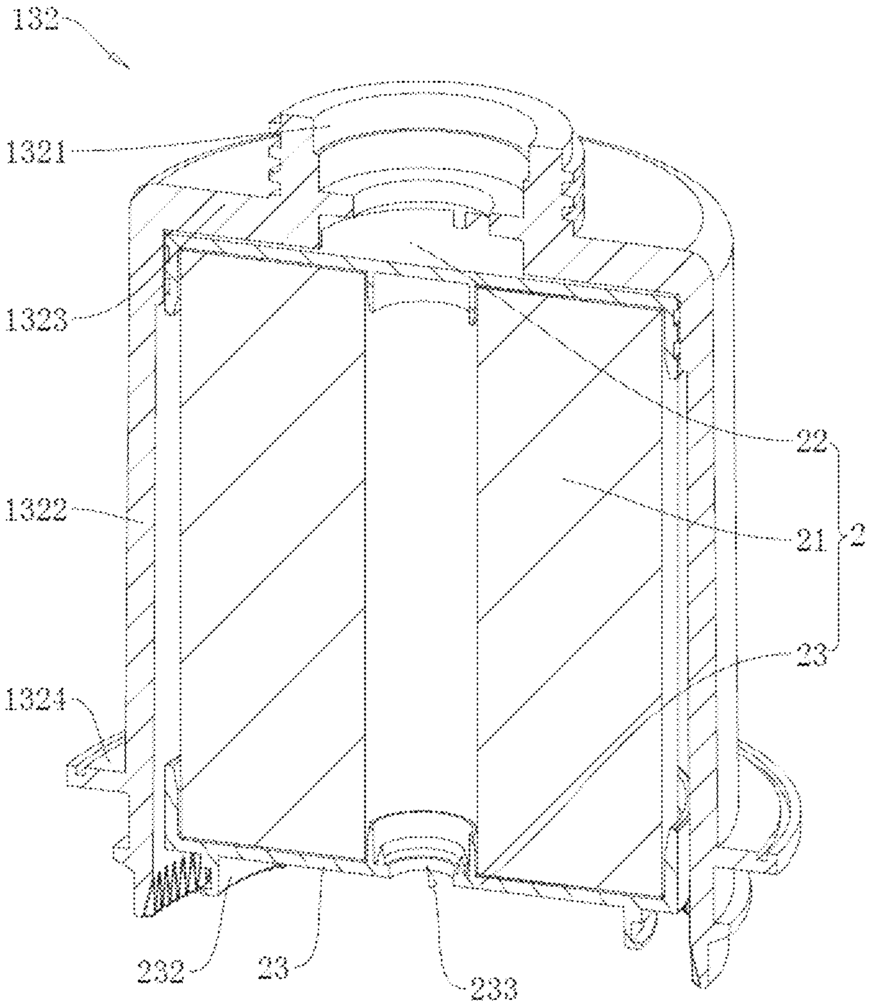
FIG. 4 is a schematic diagram showing the structure of a filtering device and a positioning member according to the present application.

Referring to FIGS. 2 and 4, the positioning member 132 includes a first connecting cylinder 1321, a positioning cylinder 1322, and an annular connecting ring 1323, where both the first connecting cylinder 1321 and the positioning cylinder 1322 have open ends at both extremities. The bottom end of the first connecting cylinder 1321 is integrally formed with the upper surface of the connecting ring 1323, the top end of the positioning cylinder 1322 is integrally formed with a lower surface of the connecting ring 1323, and the diameter of the first connecting cylinder 1321 is less than that of the positioning cylinder 1322. A first water inlet hole is defined in the center of the connecting ring 1323, the inner diameter of the connecting ring 1323 is the same as the diameter of the first water inlet hole, while the outer diameter of the connecting ring 1323 is the same as that of the positioning cylinder 1322. The filter mechanism is mounted inside the positioning cylinder 1322. The outer side wall of the positioning cylinder 1322 is integrally formed with a stiffening ring, and the bottom end of the top cover 11 is snap-fitted onto the stiffening ring to increase the overall structural strength of the top cover 11.

Referring to FIG. 2, the water inflow mechanism 13 further includes a water inflow valve 133, an inner side wall of the water inflow valve 133 is configured with a water inflow channel 1331. One end of the water inflow channel 1331 communicates externally, while the other end is in communication with the first water inlet hole. The water inflow valve 133 includes a second connecting cylinder 1332 and a spherical seat 1333, the bottom end of the second connecting cylinder 1332 is integrally formed with the top end of the spherical seat 1333, and the water inflow channel 1331 extends through both the second connecting cylinder 1332 and the spherical seat 1333. The spherical seat 1333 is fixed inside the mounting ring 131, the second connecting cylinder 1332 is located outside the top cover 11. An inner side wall of the second connecting cylinder 1332 is provided with internal threads for threaded connection to an external connecting member (such as a water pipe) to realize water inflow.

Continuing to refer to FIG. 2, the mounting ring 131 is internally provided with a first clamping member 134, and the inner side wall of the second connecting cylinder 1332 is provided with a second clamping member 135. The spherical seat 1333 is held between the first clamping member 134 and the second clamping member 135, so that the water inflow valve 133 is fixed at the water inlet end of the top cover 11. The first clamping member 134 and the second clamping member 135 are both annular and provided with arc-shaped recesses on sides facing the spherical seat 1333 to increase contact areas with the spherical seat 1333, thereby improving the installation security of the water inflow valve 133. Additionally, the inner side wall of the water inflow channel 1331 is integrally formed with a limiting ring 136, and the limiting ring 136 abuts against the bottom end of the second clamping member 135, which further increases the clamping security of the first clamping member 134 and the second clamping member 135 clamping the spherical seat 1333.

Referring to FIG. 2, the filtering device 2 includes a cylindrical filter element 21, a first sleeve 22 and a second sleeve 23. The first sleeve 22 and the second sleeve 23 are sleeved over respective ends of the filter element 21 and secured to the filter element 21. The first sleeve 22 is fixed to an inner side wall of the connecting ring 1323, thereby mounting the filtering device 2 in the top cover 11.

Figure 5:
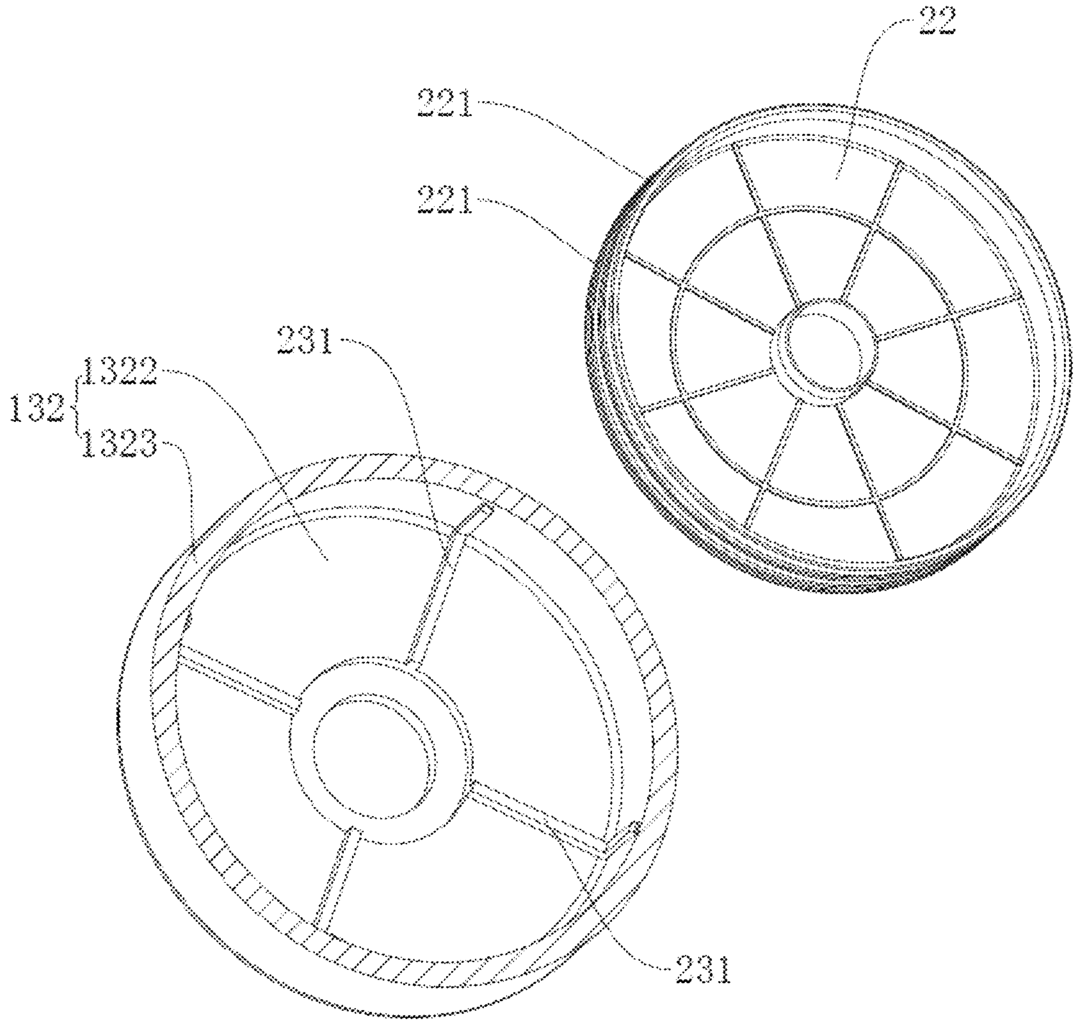
FIG. 5 is a schematic diagram showing the structure of a first collar and a second projection according to the present application.

Referring to FIGS. 4 and 5, an outer side wall of the first sleeve 22 is integrally formed with a plurality of annular first collars 221 spaced apart in the axial direction. A plurality of L-shaped second projections 231 are provided on the inner side walls of the positioning cylinder 1322 and the connecting ring 1323 in the circumferential direction, so that when the outer side wall of the first collar 221 abuts against the outer side wall of the second projection 231, a clearance between the filtering device 2 and the positioning member 132 can be defined to ensure an unimpeded water flow. A second water outlet hole 233 is formed in the center of the second sleeve 23, allowing the passage of water after filtering by the filter element 21 through the water passage for subsequent delivery to the gear adjustment device 3.

Referring to FIGS. 2 and 3, the base cover 12 includes a bearing ring 121, a cover body 122, and a water outlet panel 123, where the top end of the cover body 122 is integrally formed with the bearing ring 121, and the water outlet panel 123 is detachably connected to the bottom end of the cover body 122 to facilitate mounting and dismounting of the water outlet panel 123. A plurality of first water outlet holes 124 are defined on the water outlet panel 123. The bottom end of the top cover 11 is open and abuts against the top end of the base cover 12. A clamping device 4 for clamping the top cover 11 is provided in the base cover 12, which increases the convenience of mounting and dismounting the top cover 11, thereby enhancing the convenience of replacing the filtering device 2.

Continuing refer to FIGS. 2 and 3, the clamping device 4 includes two mutually symmetrical clamping mechanisms 41 and two release mechanisms 42. Each clamping mechanism 41 includes a clamping half-ring 411 and a first resilient member 412, where the clamping half-ring 411 is arranged between the bearing ring 121 and the gear adjustment device 3 to function as a key connection. The first resilient member 412 is a spring, and is arranged between the clamping half-ring 411 and the cover body 122. One end of the first resilient member 412 abuts against the outer side wall of the clamping half-ring 411 while the other end thereof firmly abuts against the inner side wall of the cover body 122. The two clamping half-rings 411 can be brought close to each other by the resilient force of the first resilient member 412 to clamp the positioning cylinder 1322, thereby achieving a stable connection between the top cover 11 and the base cover 12.

Continuing to refer to FIGS. 2-4, the outside wall of the positioning cylinder 1322 is further integrally formed with a first positioning lip 1324. When the top cover 11 and the base cover 12 are connected together, under the resilient force of the spring, the lower surfaces of the two clamping half-rings 411 tightly abut against the upper surface of the first positioning lip 1324 to prevent the relative movement between the clamping mechanism 41 and the positioning cylinder 1322, further increasing the clamping firmness of the clamping mechanism 41 clamping the positioning cylinder 1322.

Continuing to refer to FIGS. 2 and 3, the base cover 12 is further provided with two mutually symmetrical release mechanisms 42 for easily releasing and separating the top cover 11 from the base cover 12 when necessary. Each of the release mechanisms 42 includes a first rotating member 421 and a button 422. The first rotating member 421 is pivotably connected to the base cover 12, the button 422 is slidable on the base cover 12. The button 422 is used to drive the rotation of the first rotating member 421, so as to release the two clamping mechanisms 41 at the same time.

Continuing to refer to FIGS. 2 and 3, the first rotating member 421 includes a rotating shaft 4211, a driving block 4212, a driven block 4213, and a linkage block 4214, where a first end of the driving block 4212 is integrally formed with the rotating shaft 4211, a first end of the driven block 4213 is integrally formed with the rotating shaft 4211, the driving block 4212 and the driven block 4213 combine to form a V-shaped structure, and the linkage block 4214 is integrally formed with a second end of the driven block 4213 away from the rotating shaft 4211. The inner side wall of the base cover 12 is integrally formed with two mutually symmetrical holders, and the rotating shaft 4211 passes through the holder and is rotationally connected with the holder. The linkage block 4214 is located between the two clamping half-rings 411 and abuts against the inner side walls of the two clamping half-rings 411 at the same time. Through sliding holes 126 are formed on opposite sides of the cover body 122 with each through sliding hole corresponding to one button 422. The button 422 passes through the sliding hole 126 and is slidable within the cover body 122, and the bottom end of the button 422 abuts against as second end of the driving block 4212 away from the rotating shaft 4211. The user can easily release the clamping half-rings 411 to separate the top cover 11 from the base cover 12 by moving of the linkage block 4214 through the rotation of the first rotating member 421 by only slightly pressing the button 422, thereby manually replacing the filtering device 2.

Continuing to refer to FIGS. 2 and 3, an outer side wall of an end of each linkage block 4214 is formed with a first inclined face 4215, and the inner side wall of an end of each clamping half-ring 411 is formed with a second inclined face 413. The first inclined face 4215 is attached to a respective second inclined face 413. The two mutually symmetrical release mechanisms 42 operate in coordination with the button 422 via the first rotating member 421. The rotating shaft 4211 is rotatably connected to a respective holder 125 on the inner side wall of the base cover 12, and the V-shaped driving block 4212 and driven block 4213 enable the linkage block 4214 to move along with the rotation of the first rotating member 421 and to be inserted into the clearance between the two clamping half-rings 411, thereby achieving a stable abutment through the attachment of the first inclined face 4215 and the second inclined face 413. When the user presses the button 422, the button 422 slides along the sliding hole 126 of the cover body 122 and pushes the driving block 4212, thereby driving the entire first rotating member 421 and the linkage block 4214 to operate, and thus achieving the releasing function.

Referring to FIG. 2, in order to prevent accidental disengagement of the buttons 422 during operation, an outer side wall of each button 422 at an end facing the first rotating member 421 is integrally formed with an anti-drop ring 4221 with a diameter larger than that of the button 422, so as to provide additional support and fixing function for the button 422, ensuring the stability and reliability of the buttons 422.

Figure 6:
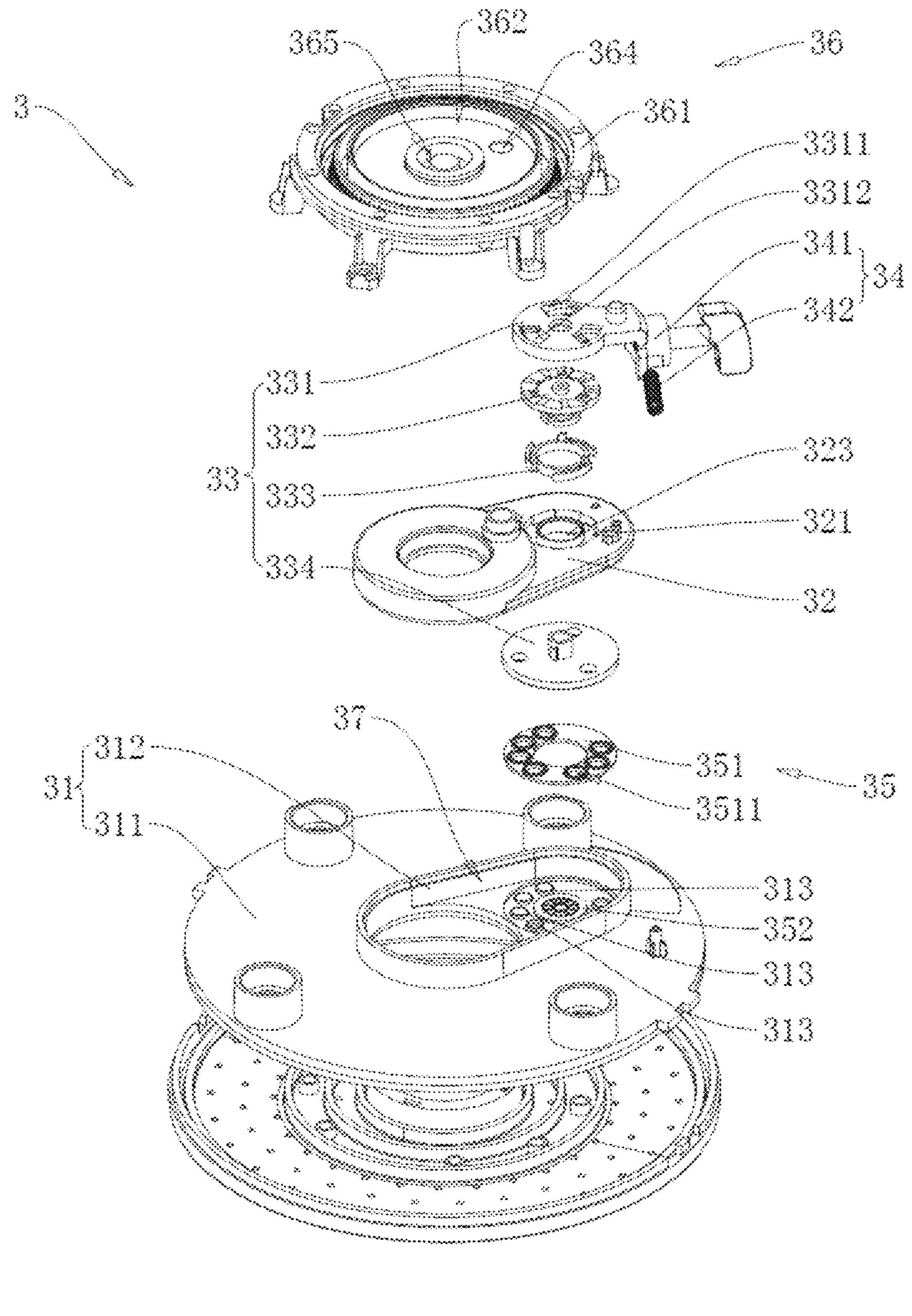
FIG. 6 is a schematic diagram showing the assembly relationship of a gear adjustment device according to the present application.

Referring to FIG. 6, the gear adjustment device 3 includes a drainage base 31, amounting seat 32, a gear adjustment mechanism 33, a return mechanism 34, a buffer mechanism 35, and a flow distribution mechanism 36.

Continuing to refer to FIG. 6, the drainage base 31 includes a drainage pan 311 and an annular member 312 integrally formed on an upper surface of the drainage pan 311. The mounting seat 32 is secured to the annular member 312, and a cavity 37 is formed among the mounting seat 32, the annular member 312 and the drainage pan 311. The gear adjustment mechanism 33 is arranged on the mounting seat 32, and a part of the gear adjustment mechanism is located outside the cavity 37 while a part thereof is located inside the cavity 37.

Referring to FIGS. 2 and 6, the gear adjustment mechanism 33 includes an active rotary seat 331, an intermediate rotary seat 332, an annular rotary seat 333, and a gear adjustment seat 334. The active rotary seat 331 is rotatably provided between the flow distribution mechanism 36 and the mounting seat 32, the bottom of the flow distribution mechanism 36 abuts against the upper surface of the active rotary seat 331, and the upper surface of the mounting seat 32 abuts against the lower surface of the active rotary seat 331, which increases the rotational stability of the active rotary seat 331. The annular rotary seat 333 executes an intermittent rotation relative to the mounting seat 32 in 20° per rotational increment. The intermediate rotary seat 332 is located between the active rotary seat 331 and the annular rotary seat 333. The intermediate rotary seat 332 passes through the mounting seat 32 and is rotatably connected to the mounting seat 32 in 20° per rotational increment. The annular rotary seat 333 is inserted into the intermediate rotary seat 332 to ensure the synchronous rotation of the both. The active rotary seat 331 is rotatably connected to the intermediate rotary seat 332 to drive the intermediate rotary seat 332 to execute an intermittent rotation during rotation. The intermediate rotary seat 332 is in plug-in engagement with the gear adjustment seat 334 so as to drive the gear adjustment seat 334 to rotate in 20° per rotational increment.

Figure 7:
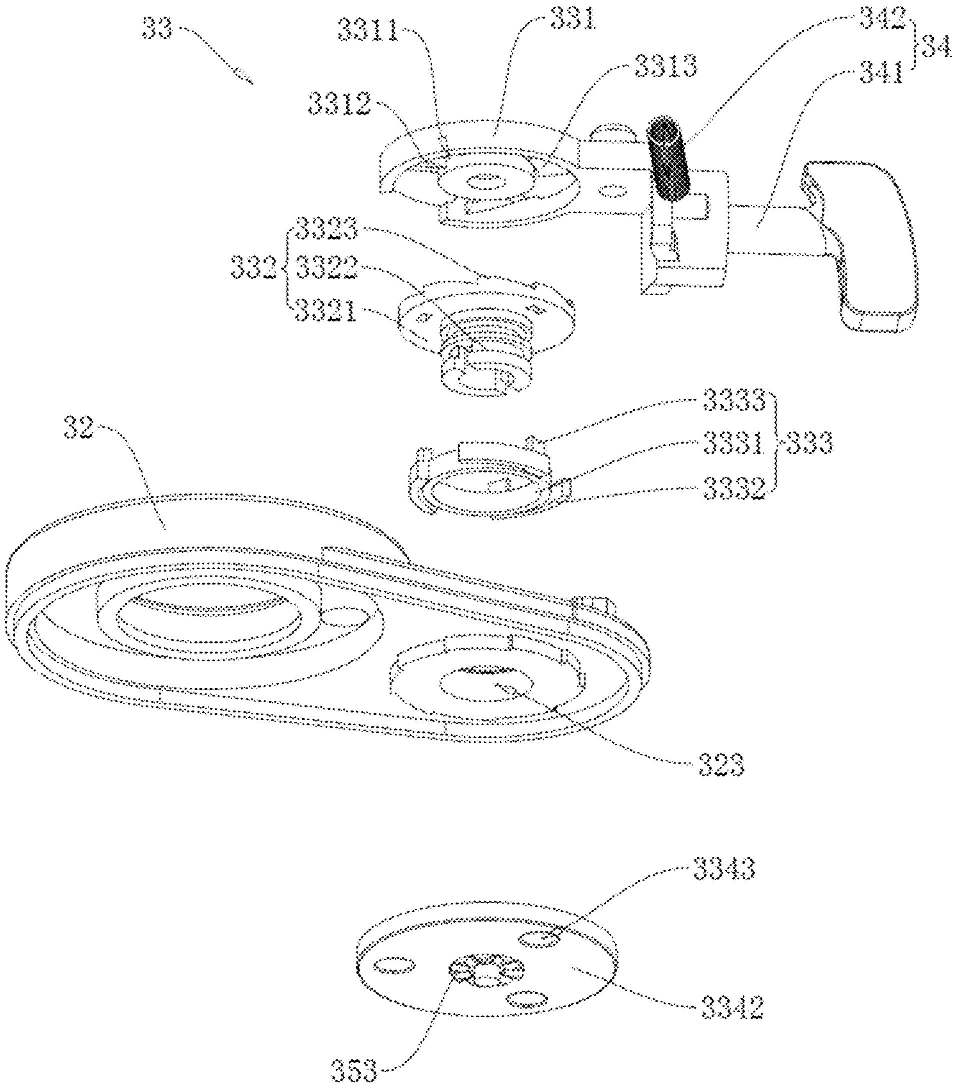
FIG. 7 is a schematic diagram showing the assembly relationship of the gear adjustment device according to the present application from another perspective.

Referring to FIGS. 6 and 7, the active rotary seat 331 is circumferentially formed with three void slots 3311, and each void slot 3311 has an inclined elastic drive segment 3312 integrally formed on its inner side wall. A surface of each elastic drive segment 3312 facing the intermediate rotary seat 332 is formed with a third inclined face 3313, so that when the active rotary seat 331 rotates relative to the intermediate rotary seat 332, an effective driving force can be generated to drive the intermediate rotary seat 332 to execute an intermittent rotation in 20° per rotational increment.

Figure 8:
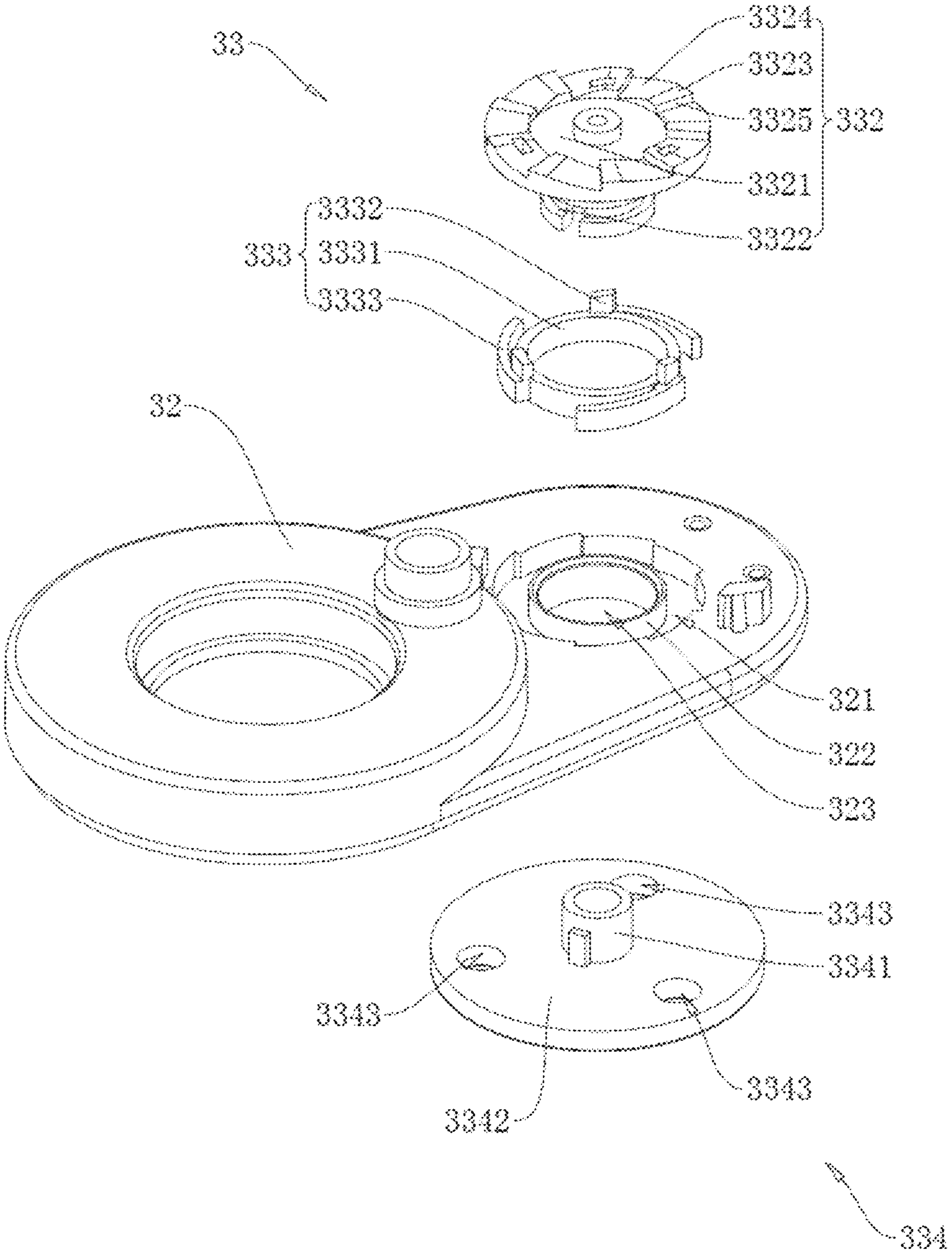
FIG. 8 is a schematic structural diagram showing an intermediate rotary seat and an annular rotary seat according to the present application.

Referring to FIGS. 6, 7 and 8, the intermediate rotary seat 332 includes an integrally formed second rotating member 3321 and first insert member 3322, ensuring structural integrity and strength. The first insert member 3322 is in plug-in engagement with the gear adjustment seat 334, which not only enhances the assembly and disassembly convenience of the both, but also maintains the synchronous rotation of the intermediate rotary seat 332 and the gear adjustment seat 334. The upper surface of the second rotating member 3321 is formed with nine driven inclined platforms 3323 arranged circumferentially in rotational symmetry, and an upper surface of each driven inclined platform 3323 is formed with a guide arc face 3324. The identical extremity of each of the nine driven inclined platforms 3323 is formed with a vertical arrest face 3325. The third inclined face 3313 of the elastic drive segment 3312 abuts against the guide arc face 3324 of the driven inclined platform 3323, and the end of the elastic drive segment 3312 abuts against the arrest face 3325 of the driven inclined platform 3323. When the active rotary seat 331 rotates clockwise, the third inclined face 3313 rotates relative to the guide arc face 3324, and at this time, the active rotary seat 331 does not drive the intermediate rotary seat 332 to rotate. When the active rotary seat 331 rotates counterclockwise, the end of the elastic drive segment 3312 abuts against the arrest face 3325 of the driven inclined platform 3323, and at this time, the active rotary seat 331 may drive the intermediate rotary seat 332 to rotate in 20° per rotational increment.

Referring to FIGS. 6, 7, and 8, the annular rotary seat 333 includes a rotating ring 3331 that is rotatably connected to the mounting seat 32. The upper surface of the mounting seat 32 is configured with a first rotational groove 321, the depth of the first rotational groove 321 is less than the thickness of the mounting seat 32. The rotating ring 3331 is rotatably arranged inside the first rotational groove 321. A first guide hole 323 is further formed centrally within the first rotational groove 321 for passage of the intermediate rotary seat 332, and the diameter of the first guide hole 323 is less than that of the first rotational groove 321. An annular shaft 322 is integrally formed at a bottom of the first rotational groove 321, and the rotating ring 3331 is sleeved over the annular shaft 322 and is rotatably connected to the annular shaft 322.

Continuing to refer to FIGS. 6, 7 and 8, a side of the rotating ring 3331 facing the active rotary seat 331 is integrally formed with a plurality of insertion parts 3332. The active rotary seat 331 is circumferentially formed with a plurality of insertion slots with each insertion slot corresponding to one insertion part 3332. These insertion parts 3332 are inserted into the insertion slots respectively to ensure that the active rotary seat 331 may drive the annular rotary seat 333 to rotate synchronously in 20° per rotational increment when rotating. The outer side wall of the rotating ring 3331 is integrally formed with three arc-shaped first stop members 3333. The first stop member 3333 is elastically deformable, to interact with nine driven inclined platforms circumferentially along the inner side wall of the first rotational groove 321. The nine driven inclined platforms are distributed in a centrosymmetric pattern, and each driven inclined platform includes a guide arc face and an arrest face, to ensure that the intermediate rotary seat 332 can only rotate counterclockwise while cannot rotate clockwise.

Continuing to refer to FIGS. 6, 7 and 8, specifically, during the counterclockwise rotation of the intermediate rotary seat 332, the outer side wall of the first stop member 3333 may abut against the inner side wall of the guide arc face 3324 and smoothly rotates along the guide arc face 3324 in 20° per rotational increment. When an attempt is made to rotate the intermediate rotary seat 332 clockwise, the arrest face 3325 of the driven inclined platform 3323 may stop the end of the first stop member 3333, thereby preventing the clockwise rotation. This not only ensures smooth rotation, but also provides an effective limitation of rotation direction.

Continuing to refer to FIGS. 6, 7 and 8, when the active rotary seat 331 rotates relative to the intermediate rotary seat 332, the third inclined faces 3313 of the elastic drive segments 3312 may abut against the guide arc faces 3324 of three driven inclined platforms 3323, respectively, which may generate interaction force between the both during rotation. In particular, when the active rotary seat 331 rotates clockwise, the active rotary seat 331 will not rotate the intermediate rotary seat 332 since the interaction force of the elastic drive segment 3312 and the driven inclined platform 3323 is insufficient to overcome other resistance. However, when the active rotary seat 331 rotates counterclockwise, the end of the elastic drive segment 3312 may push the arrest face 3325 of the driven inclined platform 3323, thereby generating a sufficient driving force to rotate the intermediate rotary seat 332. Not only the limitation of the rotation direction is achieved, but also the reliability and accuracy of the rotation is ensured.

Referring to FIGS. 6 and 7, the return mechanism 34 includes a driving seat 341 and a second resilient member 342, one end of the driving seat 341 is fixedly connected to the active rotary seat 331. The side wall of the base cover 12 is formed with a sliding hole 126 through which the driving seat 341 passes, the sliding hole 126 extends in the horizontal direction, and the driving seat 341 is in sliding engagement with the sliding hole 126 when rotating. One end of the second resilient member 342 is connected to the driving seat 341 while the other end thereof is connected to the drainage base 31. In the present embodiment, the second resilient member 342 is a spring. When the driving seat 341 rotates from one end of the sliding hole 126 to the other end of the sliding hole 126, the active rotary seat 331 rotates precisely 20°, accomplishing a single position indexing adjustment. When the external force on the driving seat 341 is released, the driving seat 341 is rotated to the initial position by the elastic force of the second resilient member 342, so that the next position indexing adjustment can be continued.

Referring to FIG. 8, the gear adjustment seat 334 includes a second insert member 3341 and a gear adjustment disk 3342, and a bottom end of the second insert member 3341 is integrally formed with an upper surface of the gear adjustment disk 3342. The second insert member 3341 interlocks with the first insert member 3322 to couple the gear adjustment seat 334 and the intermediate rotary seat 332 together, thereby ensuring that the rotation of the intermediate rotary seat 332 rotates the gear adjustment seat 334 to achieve spray pattern modulation.

Figure 9:
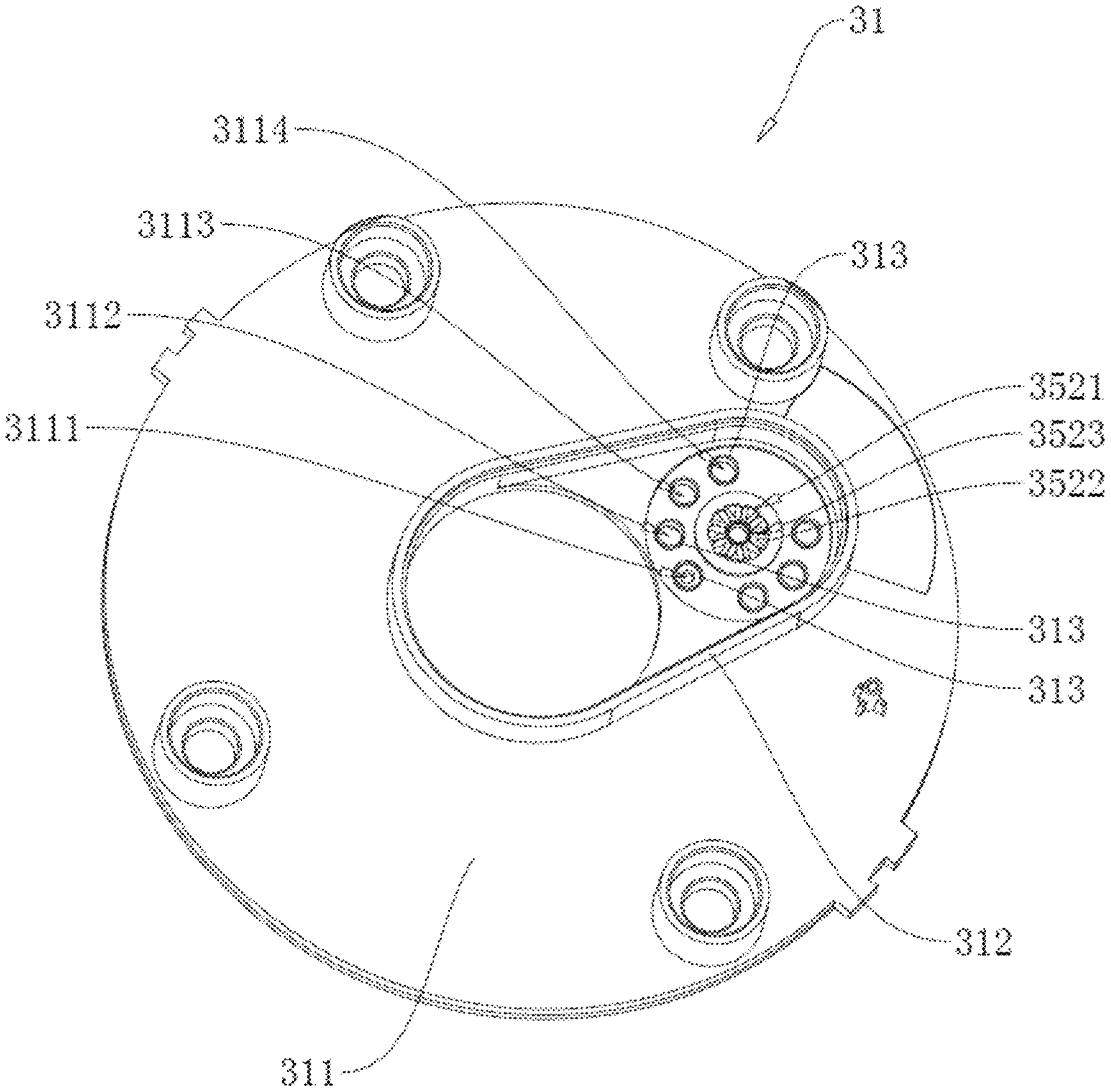
FIG. 9 is a schematic structural diagram showing a drainage pan according to the present application.

Referring to FIGS. 8 and 9, the gear adjustment disk 3342 is circumferentially formed with three second water inlet holes 3343 equidistantly distributed along the circumference, to ensure that the radial lines connecting adjacent second water inlet holes 3343 to the center of the gear adjustment disk 3342 subtends precisely 60°. The drainage pan 311 of drainage base 31 is circumferentially formed with a first drainage hole 3111, a second drainage hole 3112, a third drainage hole 3113, and a fourth drainage hole 3114 in sequence, which are equidistantly spaced from each other. The center point of the circular arc defined by the four drainage holes is designated as the central reference point. The radial line connecting the center point of the first drainage hole and the central reference point is defined as a first line segment, the radial line connecting the center point of the second drainage hole and the central reference point is defined as a second line segment, the radial line connecting the center point of the third drainage hole and the central reference point is defined as a third line segment, and the radial line connecting the center point of the fourth drainage hole and the central reference point is defined as a fourth line segment. An included angle between the first line segment and the second line segment is 20°, an included angle between the second line segment and the third line segment is 20°, an included angle between the third line segment and the fourth line segment is 20°, and an included angle between the first line segment and the fourth line segment is 60°. Since the three second water inlet holes 3343 and the three first water outlet holes 124 are equidistantly distributed in the circumferential direction, and the included angle between the first line segment and the fourth line segment is specifically defined as 60°, which matches the designed angle of the second water inlet holes 3343, so as to achieve three different water outlet modes during rotation of the gear adjustment disk 3342.

Figure 10:
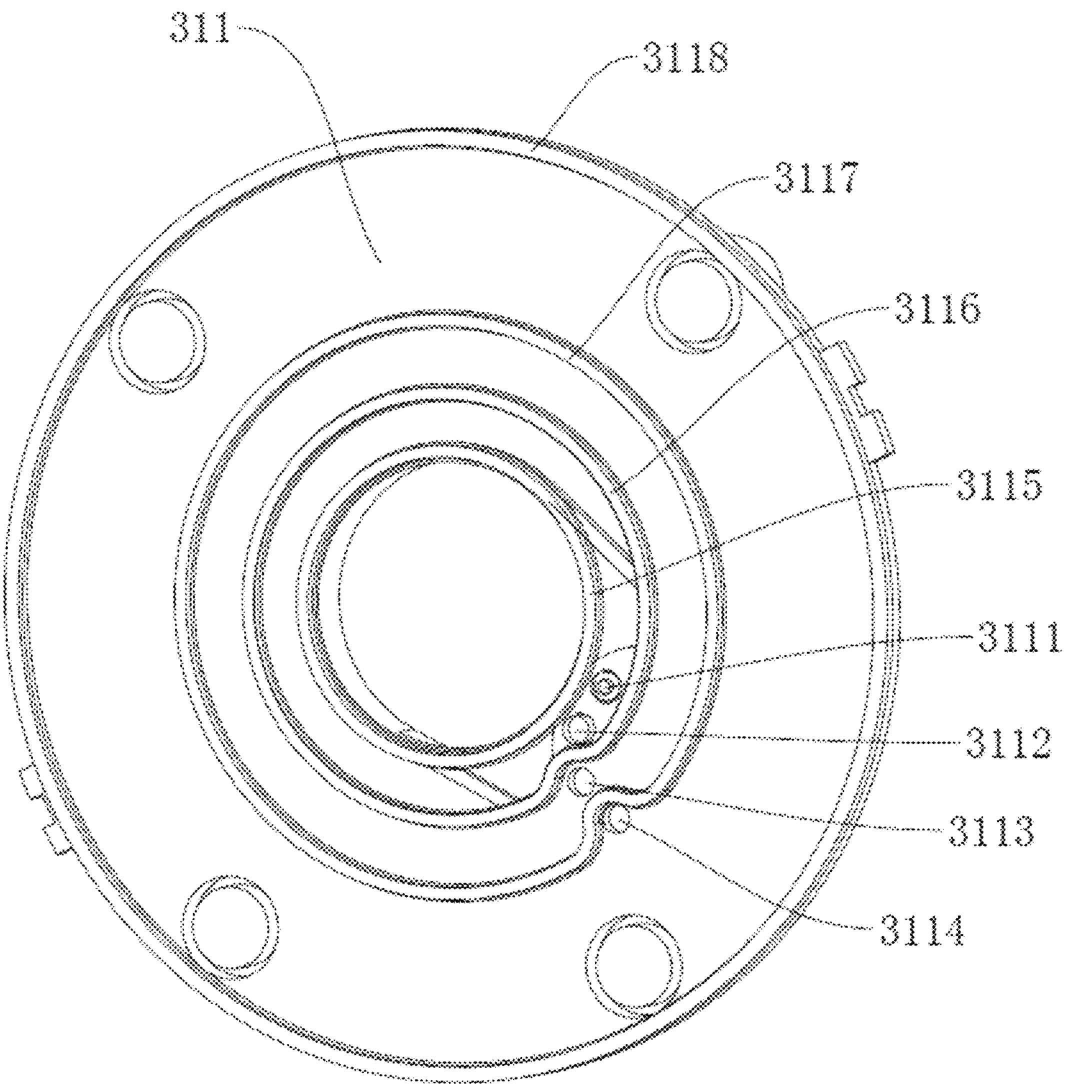
FIG. 10 is a schematic diagram showing the structure of the drainage pan according to the present application from another perspective.

Referring to FIGS. 9 and 10, the lower surface of the drainage pan 311 is sequentially provided from inside to outside with a first partition ring 3115, a second partition ring 3116, a third partition ring 3117 and a sealing ring 3118 progressing from the interior to outward, which have gradually increasing diameters. The first drainage hole 3111 and the second drainage hole 3112 are located between the first partition ring 3115 and the second partition ring 3116, the third drainage hole 3113 is located between the second partition ring 3116 and the third partition ring 3117, and the fourth drainage hole 3114 is located between the third partition ring 3117 and the sealing ring 3118. When one of the second water inlet holes 3343 is aligned with the first drainage hole 3111, and the adjacent second water inlet hole 3343 is aligned with the fourth drainage hole 3114, maximum water flow is achieved. When one of the second water inlet holes 3343 is aligned with the second drainage hole 3112 or the third drainage hole 3113, the other two second water inlet holes 3343 are blocked by the drainage base 31. Users can effortlessly switch between three distinct water flow modes—mist, rainfall and jet—tailoring the water dispersion pattern to their specific needs. In addition, it is to be noted that the diameters of the first, second, third and fourth drainage holes 3111, 3112, 3113 and 3114 can be flexibly designed according to actual requirements, and can be the same or different to meet the personalized requirements of different users.

Referring to FIG. 9, in order to enhance the rotational stability of the gear adjustment disk 3342, the upper surface of the drainage base 31 is further circumferentially provided with a plurality of positioning convex rings 313, where four positioning convex rings 313 respectively correspond to four drainage holes one by one.

Referring to FIGS. 6 and 9, the buffer mechanism 35 is located between the gear adjustment disk 3342 and the plurality of positioning convex rings 313. The buffer mechanism 35 includes an annular flexible buffer pad 351. The flexible buffer pad 351 is circumferentially formed with a plurality of second guide holes 3511. Each second guide holes 3511 corresponds to one positioning convex ring 313, and each positioning convex ring 313 passes through one second guide hole 3511. Additionally, the flexible buffer pad 351 envelops the outer peripheral surfaces of the plurality of positioning convex rings 313. The flexible buffer pad 351 protects both the gear adjustment disk 3342 and the drainage base 31 to extend the service life of the gear adjustment disk 3342 and the drainage base 31.

Referring to FIGS. 6, 7 and 9, the buffer mechanism 35 further includes a first mounting boss 352 integrally formed on the upper surface of the drainage pan 311, and a second mounting boss 353 integrally formed on the lower surface of the gear adjustment disk 3342. The top end of the first mounting boss 352 is configured with a second rotational groove 3521, the bottom of the second rotational groove 3521 is circumferentially provided with a plurality of first protrusions 3522, a first slot 3523 is formed between each pair of adjacent protrusions, and the first protrusion 3522 and the first slot are both triangular. The second mounting boss 353 is rotatably connected to the second rotational groove 3521, and the shape of the end of the second mounting boss 353 is completely consistent with the structure of the top end of the first mounting boss 352, which enables the gear adjustment disk 3342 to be smoothly rotatably connected to the drainage base 31, not only ensuring the smooth rotation of the gear adjustment disk 3342, but also, more importantly, providing a good protection for the flexible buffer pad, avoiding wear or damage caused by long-term or frequent contact.

Referring to FIGS. 4 and 6, the flow distribution mechanism 36 includes a flow distribution seat 361, and the inner side wall of the base cover 12 is integrally formed with a plurality of stud bolts, and surfaces of the plurality of stud bolts abut against the surface of the flow distribution seat 361 to fix the flow distribution seat 361 inside the base cover 12. In the present embodiment, the flow distribution seat 361 is located between the filtering device 2 and the gear adjustment mechanism 33. A positioning slot 362 is defined in the center of the flow distribution seat 361 at its top end, a third positioning ring 232 is integrally formed on the lower surface of the second sleeve 23, and the outer side wall of the third positioning ring 232 abuts against the inner side wall of the positioning slot 362 to fix the second sleeve 23 on the flow distribution seat 361. A sealing ring is provided between the outer side wall of the third positioning ring 232 and the inner side wall of the positioning slot 362 to increase the seal therebetween.

Referring to FIGS. 2, 4, and 6, the second sleeve 23, the third positioning ring 232, and the flow distribution seat 361 enclose internally a water storage chamber 363. A first distribution hole 364 and a second distribution hole 365 are formed through the bottom of the positioning slot 362, and the first distribution hole 364 and the second distribution hole 365 are independent from each other and do not communicate with each other. The first distribution hole 364 is configured to direct water in the water storage chamber 363 directly to the gear adjustment device 3, and after precise adjustment, the water flow finally falls gracefully on the water outlet panel 123 to bring a delicate and changeable water outlet experience for the user.

Referring to FIGS. 2 and 6, the fragrance release module 5 is inserted into the second distribution hole 365, and the design thereof is derived from the retractable pen mechanism, which is not only simple in operation but also versatile in function. Various items such as seasoning agents, aromatic tablets, and soap can be flexibly stored inside, adding a unique lasting appeal to the water flow. When a user wishes to replace these flavor enhancing items, the attachment and detachment of the fragrance release module 5 can be easily accomplished with a light press, so as to replace the items in the fragrance release module 5 conveniently and quickly.

It should be noted that the second distribution hole 365, as a bridge connecting the water storage chamber 363 and the fragrance release module 5, ensures that water flows smoothly through the fragrance release module 5, fully absorbs the fragrance or taste therein, and then flows through the water outlet panel 123, to present the carefully modulated water flow to the user. It not only improves the quality of water use, but also adds another kind of interest and enjoyment to daily life.

The implementation principle of the above-mentioned embodiment is as follows: purification of shower water quality and flexible adjustment of water flow volume and spray pattern are achieved through the meticulously designed housing 1, the integrated filtering device 2, and the gear adjustment device 3. Water enters through the water inlet 111 at the end of the top cover 11, passes through the filtering device 2 that intercepts impurities, flows into the gear adjustment device 3 in the base cover 12 through the water passage, allows users to modulate the water flow volume and spray pattern via the gear adjustment mechanism, and purified, personalized water stream is discharged from the first water outlet holes 124 at the end of the base cover 12, thereby ensuring water purity while enhancing personalization with bespoke comfort.

The above descriptions represent exemplary embodiments of the present application, which shall not be construed as limiting the scope of protection. Accordingly: all equivalent modifications based on the structure, shape, or principles of the present application shall fall within the scope of protection of the present application.

LIST OF REFERENCE SIGNS

- 1 housing
- 11 top cover
- 111 water inlet
- 12 base cover
- 121 bearing ring
- 122 cover body
- 123 water outlet panel
- 124 first water outlet hole
- 126 sliding hole
- 13 water inflow mechanism
- 131 mounting ring
- 132 positioning member
- 1321 first connecting cylinder
- 1322 positioning cylinder
- 1323 connecting ring
- 1324 first positioning lip
- 133 water inflow valve
- 1331 water inflow channel
- 1332 second connecting cylinder
- 1333 spherical seat
- 134 first clamping member
- 135 second clamping member
- 136 limiting ring
- 2 filtering device
- 21 filter element
- 22 first sleeve
- 221 first collar
- 23 second sleeve
- 231 second projection
- 232 third positioning ring
- 233 second water outlet hole
- 3 gear adjustment device
- 31 drainage base
- 311 drainage pan
- 3111 first drainage hole
- 3112 second drainage hole
- 3113 third drainage hole
- 3114 fourth drainage hole
- 3115 first partition ring
- 3116 second partition ring
- 3117 third partition ring
- 3118 sealing ring
- 312 annular member
- 313 positioning convex ring
- 32 mounting seat
- 321 first rotational groove
- 322 annular shaft
- 323 first guide hole
- 33 gear adjustment mechanism
- 331 active rotary seat
- 3311 void slot
- 3312 elastic drive segment
- 3313 third inclined face
- 3314 insertion slot
- 332 intermediate rotary seat
- 3321 second rotating member
- 3322 first insert member
- 3323 driven inclined platform
- 3324 guide arc face
- 3325 arrest face
- 333 annular rotary seat
- 3331 rotating ring
- 3332 insert member
- 3333 first stop member
- 334 gear adjustment seat
- 3341 second insert member
- 3342 gear adjustment disk
- 3343 second water inlet hole
- 34 return mechanism
- 341 driving seat
- 342 second resilient member
- 35 buffer mechanism
- 351 flexible buffer pad
- 3511 second guide hole
- 352 first mounting boss
- 3521 second rotational groove
- 3522 first protrusion
- 3523 first slot
- 353 second mounting boss
- 36 flow distribution mechanism
- 361 flow distribution seat
- 362 positioning slot
- 363 water storage chamber
- 364 first distribution hole
- 365 second distribution hole
- 37 cavity
- 4 clamping device
- 41 clamping mechanism
- 411 clamping half-ring
- 412 first resilient member
- 413 second inclined face
- 42 release mechanism
- 421 first rotating member
- 4211 rotating shaft
- 4212 driving block
- 4213 driven block
- 4214 linkage block
- 4215 first inclined face
- 422 button
- 4221 anti-drop ring
- 5 fragrance release module

What is claimed is:

1. An overhead shower, comprising a housing, a filtering device and a gear adjustment device, wherein the housing comprises a top cover and a base cover detachably connected with each other, an end of the top cover is configured with a water inlet, an end of the base cover is configured with a first water outlet hole, the filtering device is arranged inside the top cover for intercepting impurities and particulate matters in water, the gear adjustment device is located inside the base cover for controlling water flow volume and spray pattern, a water passage is formed in the housing for connecting the filtering device and the gear adjustment device, and a first end of the water passage communicates with the water inlet while a second end of the water passage communicates with the first water outlet hole, and wherein the gear adjustment device comprises a drainage base located in the base cover, a mounting seat located on the drainage base, a gear adjustment mechanism and a return mechanism both located on the mounting seat, the gear adjustment mechanism is configured to modulate a water dispersion pattern, and a first end of the return mechanism is connected to the gear adjustment mechanism while a second end of the return mechanism is connected with the base cover.

2. The overhead shower according to claim 1, wherein the gear adjustment mechanism comprises an active rotary seat rotatably disposed in the base cover, an intermediate rotary seat inserted into the mounting seat and rotatably connected to the mounting seat, an annular rotary seat rotatably connected to the mounting seat, and a gear adjustment seat, the intermediate rotary seat interlocks with the annular rotary seat to rotate synchronously with the annular rotary seat, the active rotary seat is rotatably connected to the intermediate rotary seat to drive the intermediate rotary seat to intermittently rotate during rotation of the active rotary seat, the intermediate rotary seat interlocks with the gear adjustment seat to drive the gear adjustment seat to rotate in a preset angle per rotational increment.

3. The overhead shower according to claim 2, wherein the gear adjustment seat is formed with three water inlet holes equidistantly distributed along a circumferential direction, the drainage base is formed with four circumferentially equidistant drainage holes: a first drainage hole, a second drainage hole, a third drainage hole and a fourth drainage hole, a radial line connecting a center point of the first drainage hole and a central reference point of the drainage base is defined as a first line segment, a radial line connecting a center point of the second drainage hole and the central reference point of the drainage base is defined as a second line segment, a radial line connecting a center point of the third drainage hole and the central reference point of the drainage base is defined as a third line segment, a radial line connecting a center point of the fourth drainage hole and the central reference point of the drainage base is defined as a fourth line segment, an included angle between the first line segment and the second line segment is 20°, an included angle between the second line segment and the third line segment is 20°, and an included angle between the third line segment and the fourth line segment is 20°, so as to achieve three different water outlet modes during rotation of a gear adjustment disk.

4. The overhead shower according to claim 3, wherein a plurality of positioning convex rings are circumferentially formed on an upper surface of the drainage base for positioning the three water inlet holes, a buffer mechanism is provided between the gear adjustment seat and the drainage base, the buffer mechanism comprises a flexible buffer pad, the flexible buffer pad is circumferentially formed with a plurality of second guide holes, each of the plurality of second guide holes corresponds to one of the plurality of positioning convex rings, the plurality of positioning convex rings are inserted into the plurality of second guide holes respectively, and the flexible buffer pad envelops an outer peripheral surface of each of the plurality of positioning convex rings.

5. The overhead shower according to claim 4, wherein the buffer mechanism further comprises a first mounting boss fixed on an upper surface of a drainage pan of the drainage base and a second mounting boss fixed on the gear adjustment seat, a top end of the first mounting boss is configured with a rotational groove, a bottom of the rotational groove is circumferentially provided with a plurality of protrusions, a triangular slot is formed between each pair of adjacent protrusions of the plurality of protrusions, the second mounting boss is rotatably connected to a second rotational groove, and a shape of an end of the second mounting boss matches a structure of the top end of the first mounting boss.

6. The overhead shower according to claim 2, wherein the return mechanism comprises a driving seat and a resilient member, one end of the driving seat is fixedly connected to the active rotary seat, a side wall of the base cover is formed with a sliding hole for passage of the driving seat, the sliding hole extends horizontally, the driving seat passes through the sliding hole to form a sliding fit with the sliding hole during rotation of the driving seat, a first end of the resilient member is connected to the driving seat while a second end of the resilient member is connected to the drainage base, and when an external force on the driving seat is removed, the driving seat is rotated to an initial position by an elastic force of the resilient member.

7. The overhead shower according to claim 1, further comprising a clamping device, wherein the clamping device comprises at least one clamping mechanism and at least one release mechanism, the at least one clamping mechanism is located on the base cover for holding the top cover, and the at least one release mechanism is located on the base cover for unlocking the at least one clamping mechanism.

8. The overhead shower according to claim 7, wherein each of the at least one clamping mechanism comprises a clamping half-ring and a resilient member, the clamping half-ring is arranged between a bearing ring and the gear adjustment device, a first end of the resilient member abuts against an outer side wall of the clamping half-ring while a second end of the resilient member abuts against an inner side wall of the base cover, and the clamping half-ring is configured to generate a resilient force towards the top cover under a resilient force of the resilient member.

9. The overhead shower according to claim 8, wherein each of the at least one release mechanism comprises a rotating member and a button, the rotating member is rotatably connected with the base cover, a first end of the rotating member is located at an inner side wall at an end of the clamping half-ring, and the button is in a sliding fit with the base cover for driving a second end of the rotating member to rotate.

10. An overhead shower, comprising a housing, a filtering device, a gear adjustment device, and a clamping device, wherein the housing comprises a top cover and a base cover detachably connected with each other, an end of the top cover is configured with a water inlet, an end of the base cover is configured with a first water outlet hole, the filtering device is arranged inside the top cover for intercepting impurities and particulate matters in water, the gear adjustment device is located inside the base cover for controlling water flow volume and spray pattern, a water passage is formed in the housing for connecting the filtering device and the gear adjustment device, and a first end of the water passage communicates with the water inlet while a second end of the water passage communicates with the first water outlet hole, and wherein the clamping device comprises at least one clamping mechanism and at least one release mechanism, the at least one clamping mechanism is located on the base cover for holding the top cover, and the at least one release mechanism is located on the base cover for unlocking the at least one clamping mechanism.

11. The overhead shower according to claim 10, wherein each of the at least one clamping mechanism comprises a clamping half-ring and a resilient member, the clamping half-ring is arranged between a bearing ring and the gear adjustment device, a first end of the resilient member abuts against an outer side wall of the clamping half-ring while a second end of the resilient member abuts against an inner side wall of the base cover, and the clamping half-ring is configured to generate a resilient force towards the top cover under a resilient force of the resilient member.

12. The overhead shower according to claim 11, wherein each of the at least one release mechanism comprises a rotating member and a button, the rotating member is rotatably connected with the base cover, a first end of the rotating member is located at an inner side wall at an end of the clamping half-ring, and the button is in a sliding fit with the base cover for driving a second end of the rotating member to rotate.

* * * * *